(12) United States Patent
Redich

(10) Patent No.: US 10,323,366 B2
(45) Date of Patent: Jun. 18, 2019

(54) SAWING TOOL HAVING A PLURALITY OF DIAMOND SAW BLADES FOR FORMING A SURFACE STRUCTURE ON A ROAD SURFACE

(71) Applicant: CEDIMA Diamantwerkzeug-und Maschinenbaugesellschaft mbH, Celle (DE)

(72) Inventor: Alexander Redich, Hannover (DE)

(73) Assignee: CEDIMA Diamantwerkzeug-und Maschinenbaugesellschaft mbh, Celle (DE)

( * ) Notice: Subject to any disclaimer, the term of this patent is extended or adjusted under 35 U.S.C. 154(b) by 0 days.

(21) Appl. No.: 15/566,669

(22) PCT Filed: Apr. 14, 2016

(86) PCT No.: PCT/EP2016/058199
§ 371 (c)(1),
(2) Date: Oct. 13, 2017

(87) PCT Pub. No.: WO2016/166200
PCT Pub. Date: Oct. 20, 2016

(65) Prior Publication Data
US 2018/0135259 A1    May 17, 2018

(30) Foreign Application Priority Data
Apr. 17, 2015   (EP) ..................................... 15164093

(51) Int. Cl.
*B23D 1/18*      (2006.01)
*E01C 23/09*    (2006.01)
(Continued)

(52) U.S. Cl.
CPC .......... *E01C 23/0933* (2013.01); *B23D 61/18* (2013.01); *B28D 1/04* (2013.01); *B28D 1/121* (2013.01)

(58) Field of Classification Search
CPC .................................................... E01C 23/0933
See application file for complete search history.

(56) References Cited

U.S. PATENT DOCUMENTS 3,306,669 A * 2/1967 Christensen ........... B28D 1/186
125/39
4,463,989 A * 8/1984 Kennedy ............. E01C 23/0946
299/39.4

(Continued)

FOREIGN PATENT DOCUMENTS

| DE | 2318378 A1 | * | 9/1974 | ............. B28D 1/121 |
| DE | 2438601 A1 | * | 2/1976 | ............. B24D 5/123 |
| GB | 2290050 A | * | 12/1995 | ............. B28D 1/121 |

*Primary Examiner* — Janine M Kreck
(74) *Attorney, Agent, or Firm* — Shlesinger, Arkwright & Garvey LLP

(57) ABSTRACT

Sawing tool forms a surface structure on a road surface, has a shaft and number of diamond saw blades, each diamond saw blade has disc-shaped core with hole for placing on shaft. A segment is on outer circumference of core, and saw blades are arranged on shaft by disc-shaped core. Segments of adjacent diamond saw blades are in surface contact on longitudinal side, each segment formed from two layers adjoining one another in axial direction and extending in radial and axial direction. Axially adjoining layers of segment each have different wear resistances and wear resistance of layers in axial direction alternates over axially entire segment, so a furrow is formed by two layers adjoining one another, in order to set a grip and a noise level of the road surface. Axially adjoining layers of adjacent segments have different wear resistances forming an alternating layer structure over entire sawing tool.

17 Claims, 3 Drawing Sheets

Figure 3:
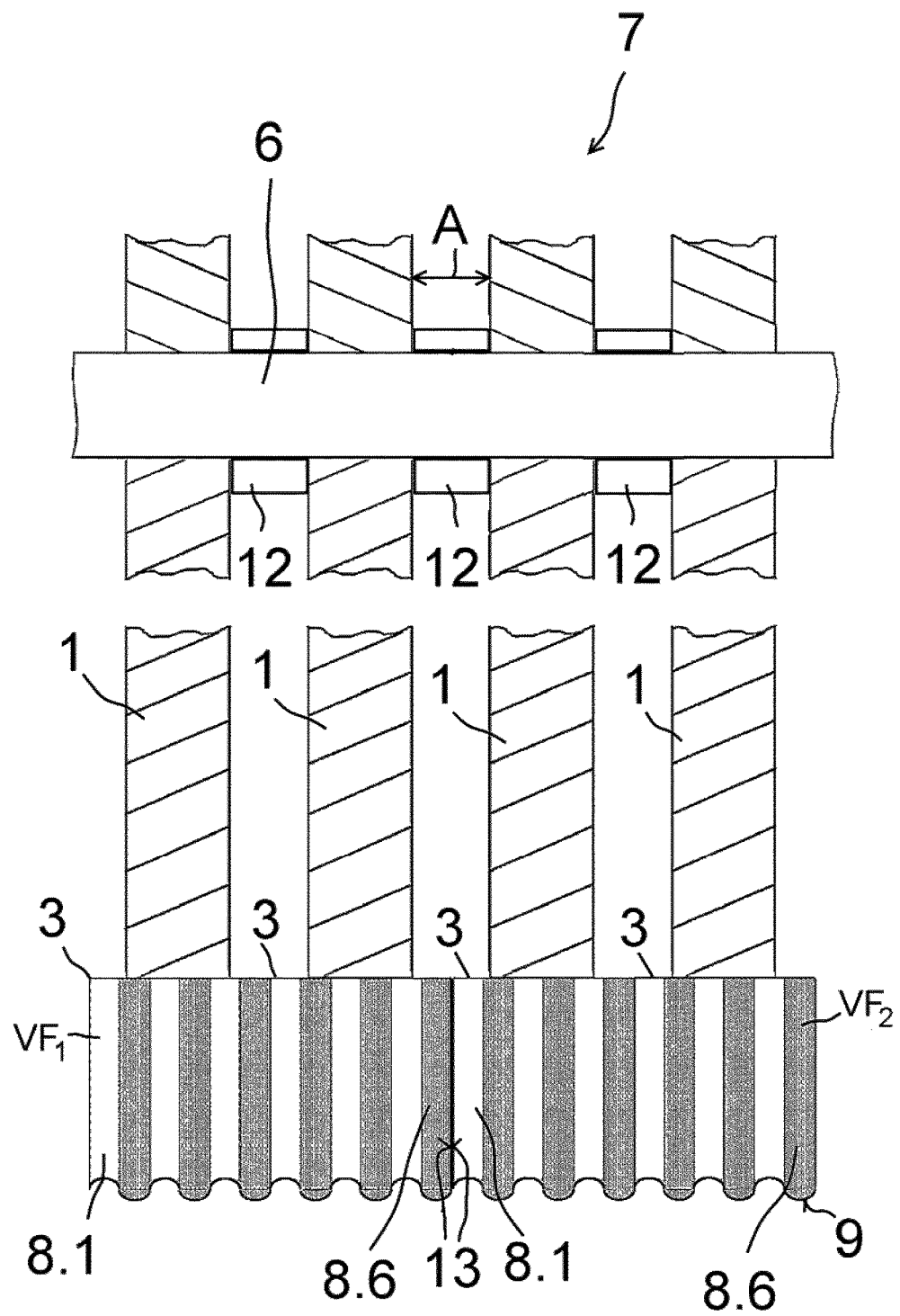

(51) Int. Cl.
*B23D 61/18* (2006.01)
*B28D 1/12* (2006.01)
*B28D 1/04* (2006.01)

(56) References Cited

U.S. PATENT DOCUMENTS

| | | | | |
|---|---|---|---|---|
| 4,883,500 | A * | 11/1989 | Deakins | B28D 1/121 |
| | | | | 51/298 |
| 5,083,839 | A * | 1/1992 | Younger | B23D 47/005 |
| | | | | 299/101 |
| 8,056,549 | B1 * | 11/2011 | Fleetwood | E01C 23/088 |
| | | | | 125/13.01 |
| 2003/0089364 | A1 * | 5/2003 | Kim | B24D 5/123 |
| | | | | 125/39 |
| 2008/0202488 | A1 * | 8/2008 | Kim | B24D 5/123 |
| | | | | 125/15 |

* cited by examiner

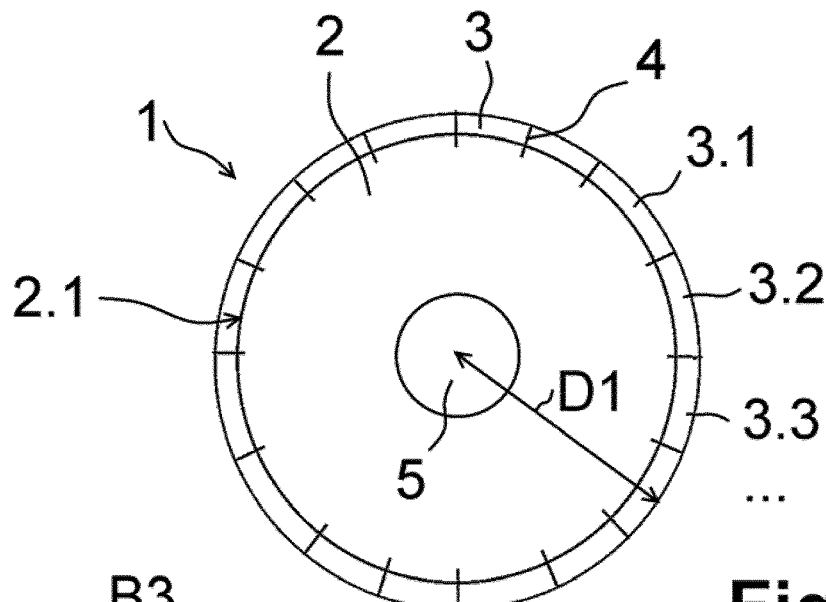
Fig. 1
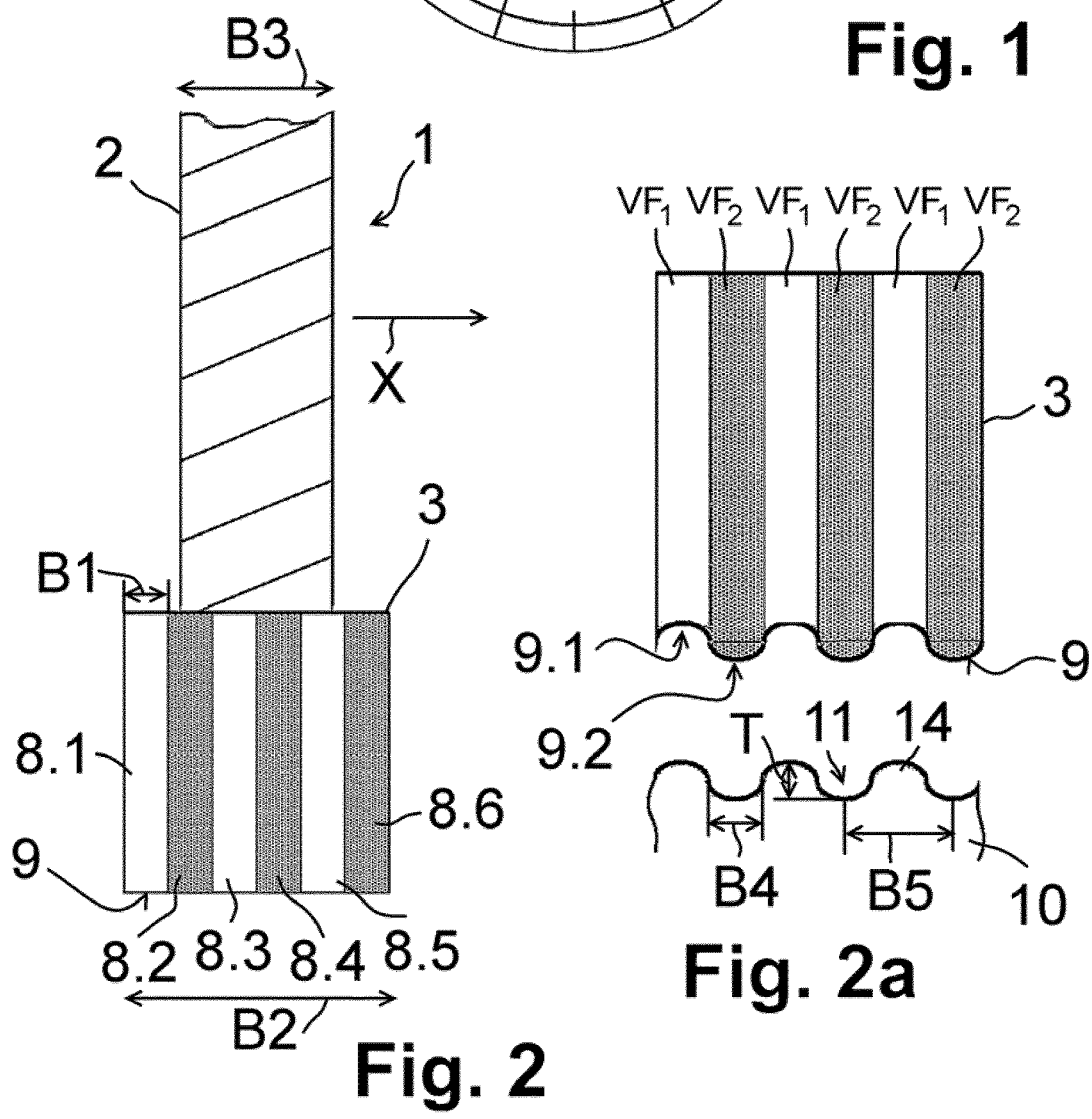
Fig. 2
Fig. 2a

SAWING TOOL HAVING A PLURALITY OF DIAMOND SAW BLADES FOR FORMING A SURFACE STRUCTURE ON A ROAD SURFACE

The Invention relates to a sawing tool with several diamond saw blades for creating a surface structure, in particular of longitudinal grooves, on a road surface as well as a machine with such a sawing tool as well as a method for creating a surface structure on a road surface.

When creating a road for vehicles, after applying e.g. concrete onto a subgrade, a planar road surface is created in several steps, which is too slippery for safe driving with a vehicle, however. In order to roughen the road surface a sawing tool with diamond saw blades is used, adding a structure or a texture respectively to the road surface, for example, longitudinal grooves extending in the direction of traffic. The longitudinal grooves serve, in particular, to improve the skid resistance property of the road surface for a vehicle driving on it. What is meant by skid resistance property is how well the drive forces of the vehicle can be transmitted through the vehicle tires onto the road surface.

The method for introducing such a longitudinal groove for improving the skid resistance property is also referred to as "grinding". Moreover, longitudinal grooves may serve to distribute water on the road surface in such a way that aquaplaning can be avoided as much as possible. Such longitudinal grooves extend deeper into the road surface and are introduced by means of a "grooving" procedure.

Longitudinal grooves introduced by means of "grooving" and "grinding" can lead to an increased noise level depending on, in particular the groove width, the groove spacing in relation to each other, the groove depth and the shape of the longitudinal grooves. Thus, in particular in residential areas, a disturbing noise disturbance may ensue. However, the afore-mentioned factors also influence the skid resistance property, so that the noise and the skid resistance property have a certain interdependency which must be observed upon creating the longitudinal grooves.

Previous methods for adding structures to road surfaces in the form of longitudinal grooves involve providing a machine with a sawing tool, said sawing tool having several diamond saw blades spaced apart from each other and arranged on a rotating shaft. The rotating Sawing tool is moved close to the road surface or, respectively, pressed onto it and pushed along the road in the direction of traffic so that the diamond saw blades upon rotation of the shaft lie on the road surface and machine away the longitudinal grooves.

To that end, each diamond saw blade is provided with a core in the form of a disc having a concentric hole whereby the diamond saw blade is placed on the shaft using the hole and affixed to the shaft such that it cannot be turned in relation to the shaft. On an outer periphery of the core one or more segments, tangentially spaced apart, are circumferentially affixed, e.g. by soldering, sintering, gluing or welding. Each segment consists of a material hardened e.g. by means of sintering or free sintering (binding), comprising, in particular, diamonds and a hardened, pressed metal powder. Hereby, the material composition of the metal powder and the concentration and the shape of the diamonds define the harness or the wear resistance respectively of the segment.

Upon generating the longitudinal grooves, depending on the hardness of the road surface and wear resistance of the segments, a suitable longitudinal groove is machined out whereby the groove width is determined, in particular by a segment width. The spacing between two adjacent longitudinal grooves is defined by a spacing between adjacent saw blades or adjacent segments respectively. Hereby, each saw blade machines only one longitudinal groove into the road surface so that the number of longitudinal grooves machined per sawing tool is determined by the number of adjacent saw blades on the shaft. The wear resistance of the segments of adjacent diamond saw blades is approximately equal so that each groove is approximately machined at equal groove depth and shape, provided that the progression of wear happens approximately equal across the entire sawing tool.

Hereby, it is a disadvantage that the groove width and the groove spacing with such a sawing tool have a lower technical limit because very thin diamond saw blades or very thin cores, e.g. having a core width of less that 2 mm, turned on the shaft at a small spacing in relation to each other at high speeds, no longer allow reliable operation. This is because, if the width falls short of a minimum of about 2 mm, the core extended in the radial direction can no longer be sufficiently stretched leading to the core becoming wavy thereby no longer guaranteeing a groove width that is consistent in the axial direction; in particular, the saw blades may also start to vibrate and a sustainable and homogenous structuring of the road surface can no longer be guaranteed. Moreover, in case of the core being too thin, the drive forces cannot be transmitted onto the segments; the core will tear or bend; thus, the minimum width of the core and, therewith, also of the segment has a lower technical limit.

An attainable minimum groove width, based on these considerations, of about 3.2 mm and an attainable minimum groove spacing of about 2.5 mm leads to a high noise disturbance. Moreover, the ensuing contour of the longitudinal grooves is susceptible to atmospheric conditions, e.g. ice inside the longitudinal grooves may lead to the longitudinal grooves breaking apart. Furthermore, the longitudinal grooves may be worn through continued use of the road surface, i.e. the groove depth is reduced; hereby, the skid resistance property will degrade over time, and the road surface must be reworked.

Moreover, when working the road surface using a conventional sawing tool with spaced-apart diamond saw blades, uncontrollable chipping of the road surface may ensue in the spaces between the segments. This leads to an additional undesired unevenness of the road surface.

The publication US 2008/0202488 A1 proposes a saw blade having a segment whereby within the segment diamonds are arranged embedded in several layers said layers being aligned in a cutting direction. In the axial direction, adjacent to the layers, layers without diamonds or with a lower concentration of diamonds are provided in accordance with a certain sequence and a certain layer width so that layers with differing wear resistances are created. Upon use of the saw blades this leads to less segregation of the diamonds and, therewith, in particular, an improved longevity of the saw blades because the saw blade will not wear as quickly.

The publication US 2003/0089364 A1 also describes an array with diamonds arranged in layers whereby, in addition, it is provided that segments consecutive in the peripheral direction on the saw blade have an offset arrangement of diamonds so that a bridge formed by a leading segment is cleared away by the following segment leading to an optimised efficiency and, therewith, speed upon cutting a surface. A similar saw blade is also disclosed in OS 2 318 378, whereby circumferentially every other segment on a saw blade has three layers, each having differing wear resistances, and the segments arranged between them have a constant, consistent wear resistance in order to attain a clean cutting edge upon cutting.

The citation U.S. Pat. No. 4,883,500 discloses a saw blade with segments in which the segments have three layers of differing wear resistances whereby the wear resistance is determined, in particular, by the amount of an abrasive as well as the concentration of diamonds with a layer. A comparable saw blade is also shown in OS 24 38 601, where it is provided to reinforce the machined cutting surface in relation to the central main cutting surfaces in such a way that a concave profile of the main cutting surface ensues. This can optimise wear of the saw blades.

The publication GB 2 290 050 A discloses a sawing tool comprising several saw blades on a shaft whereby the segments of a saw blade each engage with a recess in the adjacent saw blades so that two saw blades form a groove on a surface. By means of spacers adjacent saw blades can be separated from each other so that even the introduction of grooves into the surface is enabled whereby a spacing of the grooves is determined by the distances between the saw blades or the segments respectively and a Groove width by a segment width.

The invention is based on the object of providing a diamond saw blade guaranteeing a low noise disturbance and good skid resistance property of a road surface over a long period of time.

This task is solved by a sawing tool according to claim 1, a machine according to claim 12 as well as a method according to claim 13. The sub-claims define preferred further developments.

Thus, according to the invention it is provided to provide a sawing tool with several diamond saw blades each with one segment the segment being composed of layers of differing wear resistances. Hereby, the wear resistance defines the intensity or wear or fading of a layer, in particular, as a function of the hardness and the wear resistance of the material to be cut, i.e. the road surface, e.g. concrete or tarmac.

If a comparatively hard road surface, e.g. concrete, is to be cut then a layer made of a soft material has a rather high wear resistance for the concrete. If, on the other hand, a comparatively soft road surface, e.g. tarmac, is cut a layer made of a hard material has a high wear resistance for the tarmac. This means that je the material of the layers has to be adapted in accordance with the road surface.

For example, a powder mixture from, in particular, diamonds as well as a metal powder serves as starting material for making a layer. Hereby the metal powder exhibits a different material composition depending on the desired wear resistance. For example, for attaining a soft layer copper or bronze as well as steel is used as metal powder, for a hard material e.g. tungsten carbide and steel. Hereby, the metal powder advantageously serves to both chemically and mechanically bonding the diamonds in the finished layer.

The diamonds may exist in the powder mixture either in differing sizes, e.g. 20 mesh up to 60 mesh, or at varying concentrations, so as to adjust a certain wear resistance in a layer. Hereby, mesh means a number of meshes of a sieve per inch, i.e. 20 mesh=20 sieve meshes per inch, so that at 20 mesh larger diamonds may drop through the sieve than at 60 mesh. Advantageously, the diamonds may have an additional layer of titanium whereby the titanium preferably can undergo a chemical reaction with the metal powder so that an additional parameter may be utilised for adjusting the hardness or the wear resistance of a layer. Moreover, the titanium layer increases the impact sensibility of the diamonds, i.e. it may additionally protect a diamond against an impact by a particularly hard material in the road surface.

For making a segment, firstly, powder mixtures of differing wear resistances are pressed, e.g. stamped, layer by layer. Thereafter, the layers lying on top of each other are hardened, e.g. in a sintering process, to create a hardened metal segment. Hereby the segment is a single coherent segment of a metallic material (bonding) with diamonds, the wear resistance of which varies layer by layer. However, alternatively, other methods for creating a hardened metal segment may be employed, e.g. free sintering.

Thus, both by means of the composition of the metal powder and the number and shape of the diamonds a certain wear resistance is set whereby both the diamonds and the hardened metal powder contribute to the material removal, i.e. on cutting, of the road surface.

Hereby, cutting means that the rotating diamond saw blade, when its multi-layer segment comes into contact with the road surface at approximately a right angle, removes material from the road surface, i.e. the road surface material, e.g. concrete or tarmac, is milled off to generate e.g. a groove, preferably an extended longitudinal groove in the direction of traffic. Thus, by means of the groove a surface structure or texture respectively is generated on the road surface.

To that end, the segment is arranged on the outer periphery of a core in the shape of a disc with a concentric hole in its centre, the core preferably being made of steel and the segment may be affixed to the core e.g. by sintering, soldering, gluing or welding. The segment is extended in the radial and axial direction in relation to the core and designed peripherally on the outer circumference of the core whereby individual recesses or incisions running radial to the core may be provided subdividing the segment into several segment regions of equal size. Thus, what is meant by segment in accordance with the invention is a ring-shaped body running across the entire core periphery which may be divided into segment regions. A segment width, i.e. the axial extension of the segment may be, in particular, between 3 mm and 20 mm, e.g. 6 mm, with the extension of the segment being larger than the core width, i.e. the extension of the core in the axial direction.

According to the invention the layers of the segments adjoin each other in the axial direction. A layer width, i.e. the extension of a layer in the axial direction is preferably about one Millimeter so that in one segment with a segment width of e.g. 6 mm in the axial direction six layers having identical layer widths border each other. Depending on the road surface, however, another layer width, e.g. 1.5 mm may be set in order to adjust an optimum performance in terms of skid resistance property, noise and aquaplaning on the road surface.

Hereby, according to the invention, it is recognised that several grooves arranged next to each other having very narrow groove widths may be created on a road surface without having to manufacture the diamond saw blade or the segment respectively very thin thereby approaching the technical lower limit when manufacturing the core or the segment. Moreover, several grooves may be introduced by only one diamond saw blade into the road surface so that for creating the grooves on the road a spacing between segments of adjacent diamond saw blades is no longer required. Hereby, while the surface cut for generating a groove is larger because there remains no untreated spacing between the diamond saw blades. Advantageously, however, this leads to a more controlled removal of the road surface because there is no uncontrolled chipping of the road surface material since there is no more untreated spacing.

For if the rotating diamond saw blade with the multi-layer segment is placed or pressed onto the road surface the different wear resistances of the layers lead to the road surface material being removed at differing depths in the manner described as follows:

In case of a road surface material with high hardness e.g. a first layer having a lower wear resistance will wear faster than an adjacent second layer having a high wear resistance. Thus, following repeated use of the diamond saw blade on an outer segment surface, i.e. the outer periphery of the segments, where the segment touches the road surface, a notched segment surface is created. Since the first layer wears faster, it has a smaller diameter from the centre of the core than the second layer which wears more slowly. The third layer again has a reduced diameter, and so on, so that in this case in each layer with low wear resistance a circumferential notch or groove in the outer segment surface is created. Thus, the segment surface represents approximately the negative of the road surface after treatment.

In order for the segment surface being notched already on first use of the diamond saw blade the segment may first be sharpened following production, i.e. treated for a period of time until a segment surface corresponding to the wear resistance of the layers has been generated as a negative for the desired texturing of the road surface.

Thus, upon first use of the diamond saw blade merely the second layer with high wear resistance removes a part of the road surface while the first and third layer remove less compared to the second layer; a groove is created, the groove depth of which is determined by the difference between the diameter of the layers and their groove width by the layer width. Thus, e.g. grooves having a groove spacing and a groove width of ca. 1 mm can be generated. Hereby, advantageously, the groove depth can be adjusted with high precision because, independently of how strong the sawing tool is pressed onto the road surface, approximately the same groove depth ensues, the expenditure of production is reduced. For, in contrast hereto, the groove depth with conventional sawing tools depends upon how strong the sawing tool is pressed onto the road surface. This can lead to measuring inaccuracies upon approaching the sawing tool to different groove depths and, therewith, to an increased expenditure of production.

Thus, advantageously, a smaller groove width and a reduced groove spacing may be attained leading to an improved skid resistance property and also reducing the level of noise created. Moreover, the number of grooves per surface is higher so that the force of a tire riding on it can be better distributed so that also the load on the groove or a bridge running between the grooves is smaller leading to less frequent breaking thereof; the road surface has a longer life-span and, consequently, must be reworked less frequently. Therefore, an extension of the grooves may be set with high precision already by dimensioning the layers; a corresponding exact spacing of several diamond saw blades in relation to each other in a sawing tool is no longer required; the manufacturing expenditure is reduced while the accuracy in making the grooves increases.

According to the invention it is provided that the layers of a segment exhibit alternating wear resistances, i.e. a first layer with low wear resistance is bordered in the axial direction a second layer with high wear resistance followed by a third layer the wear resistance of which corresponds to that of the first layer, etc., i.e. the low and the high wear resistances alternate across the entire segment width. Hereby, advantageously, consistent grooves with a groove width and a spacing of ca. one Millimeter as well as a consistent shape of the grooves can be generated on the road surface.

Preferably, a material composition and an arrangement in relation to each other may be chosen for the layers which allows the layers to round in the axial direction at their outer periphery on a surface area upon sharpening and also during use of the diamond saw blade, i.e. during cutting the road surface whereby the rounding or bulging respectively or adjacent layers alternates, i.e. a first layer is rounded approximately concavely in the axial direction and an adjacent second layer approximately convexly. Hereby, advantageously, a waved outer segment surface with nearly fluent transitions without steps, ideally corresponding to e.g. a sinus. Hereby, the exact shape may vary depending on the hardness and construction of the road surface as well as the composition of the respective layers within a tolerance; thus, the convex or concave bulges represent an idealised progression from which small aberrations upwards and downwards are possible without deviating from a wavy course of the segment surface.

This is achieved in that layers with alternating wear resistance at a preferred layer width of ca. 1 mm border each other. During use or, respectively, during sharpening a layer with high wear resistance the wears first on the edges of the layer in contact with the road surface so that an essentially convexly rounded surface area at this layer is created. A layer with low wear resistance, on the other hand, first wears centrally and to a lesser extent at the edges so that an essentially concavely rounded surface area at this layer is created.

Hereby, advantageously, even the contour or texturing of the grooves in the road surface is wavy, i.e. the structured grooves are rounded at the edges. Hereby, advantageously, the weather resistance can be improved because ice appearing between the grooves does not break the bridge because the ice can slide across the rounded edges when expanding. Also, this leads to less sound being "caught" inside the grooves leading to a reduced noise disturbance.

The diamond saw blade is designed such that it is capable of structuring the surface of concrete or tarmac. However, it is possible to add grooves to any other type of road surface material in order to attain, in particular, the advantages of the invention.

According to the invention, sawing tool is provided, comprising a shaft on which several adjacent diamond saw blades are placed and affixed in such a way that the cannot be turned in relation to the shaft. Hereby, advantageously, the distance between each of the saw blades on the shaft is chosen such that the segments of adjacent saw blades are in contact with each other. I.e. the respective outside layers of adjacent segments touch each other in a planar manner so that the preferably alternating layer structure can be achieved even across several diamond saw blades or, respectively, across the entire sawing tool. Thus, in order to create grooves on a road surface, it is no longer necessary for the diamond saw blades to be spaced apart because the design of the layer in the segments as such guarantees that grooves are created.

Advantageously, a perpendicular load on the segments can be compensated hereby since adjacent da segments counteract a cross-load. To that end, a distance piece or spacer may be provided on the shaft in order to determine the distance between the diamond saw blades and to keep it constant during use. Moreover, the manufacturing expenditure of the sawing tool may be minimised because the distance between the diamond saw blades in the area of the segments can be omitted and no longer required adjustment to attain a corresponding groove spacing. Because this is defined already by the layer construction.

Preferably, the segments are constructed such that an even number (2n) of alternating layers per segment is provided so that the segment at one of its ends terminates with one layer of a first wear resistance and at the other end with a layer of a second wear resistance. Hereby, the alternating sequence of layers can be continued when two adjacent segments are placed next to each other correspondingly. This bears the advantage that the diamond saw blades can be successively placed on the shaft of the sawing tool merely observing the correct orientation. Thus, it is sufficient to manufacture merely one type of diamond saw blades which can be placed on the shaft. This reduces the expenditure of manufacturing and the manufacturing cost.

However, it is also conceivable to use any other layer construction, e.g. having an uneven number (2n+1) of alternating layers. In this case both end of the segment terminate with the same layer. Correspondingly, a segment having the respective other layer at its outer end must be chosen for the adjacent diamond saw blade in order to achieve an alternating um wear resistance across the entire sawing tool. In this case two types of saw blades are required to achieve an alternating um wear resistance across the entire sawing tool.

The width of the sawing tool corresponds to about 0.6 m to 1.4 m, i.e., preferably, the is an alternating layer construction across this length so that ca. 300 to 700 grooves ensue which may be cut into to road surface using one sawing tool.

Further, according to the invention, a machine is provided on which a holder for a sawing tool is formed in which the sawing tool can be rotated at preferably 35-55 m/s peripheral velocity. When the holder approaches the sawing tool to the road surface and the rotating diamond saw blades or, respectively, multi-layer segments of the shaft press onto the road surface, grooves, preferably longitudinal grooves are created in the road surface upon movement of the machine in the direction of traffic. The machine preferably moves at a speed of 3 m/min to 10 m/min.

Figure 4:
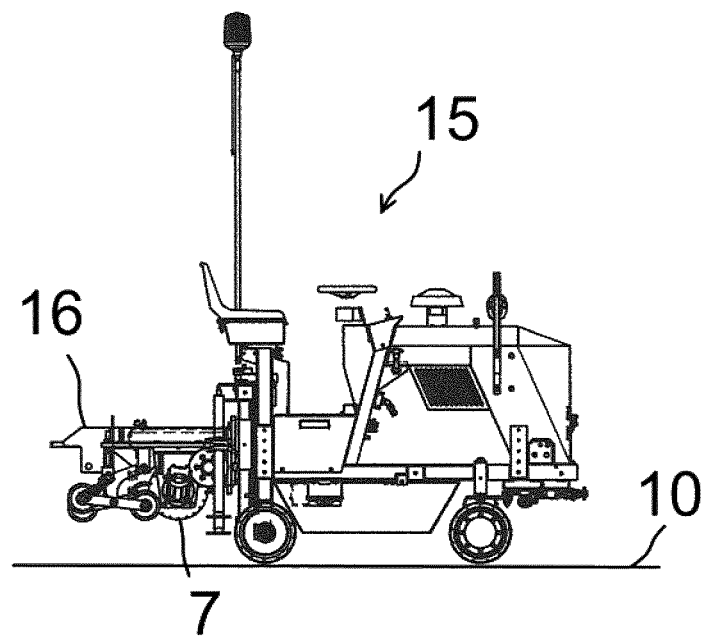

Subsequently, the invention is further illustrated by means of the drawings on the example of an embodiment. It is shown in:

FIG. 1 a diamond saw blade in an elevation;

FIG. 2 a detail of the diamond saw blade according to FIG. 1 in a sectional view;

FIG. 2a a used diamond saw blade according to FIG. 2 over a structured road surface;

FIG. 3 a sawing tool with several used diamond saw blades in a sectional view; and FIG. 4 a machine having a sawing tool according to FIG. 3.

According to FIG. 1 a diamond saw blade 1 is provided comprising a disc-like core 2 and, at its outer periphery 2.1, a circumferential segment 3. The segment 3 is subdivided by radial cuts 4 into several segment regions 3.1, 3.2, 3.3, etc. The segment 3 or the segment regions 3.1, 3.2, 3.3 are affixed to the core 2 preferably by means of sintering, soldering, gluing or welding. In the centre of the core 2 a concentric hole 5 is provided by means of which the diamond saw blade 1 can be placed onto a shaft 6 of a sawing tool 7 (s. FIG. 3).

According to this embodiment example, the segment 3 is formed from six layers 8.i, where i=1 to 6, which adjoin each other in an axial direction X in a planar manner, as shown in FIG. 2. In the axial direction X each layer 8.i has a layer width B1 of ca. 1 mm so that the segment 3 has a total segment width B2 of 6 mm. A core width B3 is ca. 3 mm, i.e. it is smaller than segment width B2. An outer segment surface 9 is planar at first, with the unused diamond saw blade 1, according to FIG. 2. I.e. an outer diameter D1 (see FIG. 1) of the segment 3 extends essentially consistently across the entire segment 3.

The individual layers 8.i have differing wear resistances VF, whereby the wear resistance within the segment 3 alternates. I.e. a first layer 8.1 has a low wear resistance $VF_1$, the second layer 8.2 a high wear resistance $VF_2$. This is followed by a third layer 8.3 with the lower wear resistance $VF_1$ and a fourth layer 8.4 with the high wear resistance $VF_2$, etc. (see FIG. 2a).

The wear resistance VF is determined by the material composition of the respective layers 8.i. Hereby, a layer 8.i is manufactured from a powder mixture made of, in particular, diamonds and a metal powder by means of a hardening process, e.g. sintering. Hereby, a concentration or a size of the diamonds and/or the material composition of the metal powder, e.g. tungsten carbide, iron and/or copper, defines the hardness and, therewith, the wear resistance VF of the layer 8.i.

Owing to the different wear resistances VF each layer 8.i has an a different interaction with the material of a road surface 10 to be structured using the diamond saw blade 1. In case of a hard material of the road surface 10 a layer 8.i with high wear resistance $VF_2$ takes more time to wear than with a layer 8.i having a low wear resistance $VF_1$.

This leads to a development of the outer segment surface 9, which is shown FIG. 2a, showing a segment 3 in its used state. Hereby, the outer segment surface 9 is waved whereby a first surface area 9.1 of the first, third and fifth layer 8.1, 8.3, 8.5 is approximately concave and a second surface area 9.2 of the second. Fourth and sixth layer 8.2, 8.4, 8.6 approximately convex. This results in a wavy, smooth transition between the layers 8.i, this being merely an idealised progression of the segment surface 9, which may vary slightly as a result of impurities in the road surface 10 or a inhomogeneous material composition of the layers 8.i.

The concave or convex bulging my essentially be achieved by virtue of the arrangement of the individual layers 8.i in relation to each other, i.e. by having the individual die layers 8.i adjoin each other in an axial direction X. This leads to a layer 8.i with high wear resistance $VF_2$ first wearing at the edges and a layer 8.i with low wear resistance $VF_1$ first in the centre so that the afore-mentioned bulges appear.

When the diamond saw blade 1 is made to rotate and pressed against the road surface 10, then the top of the road surface 10 is removed in the areas where a layer 8.i with high wear resistance $VF_2$ acts, as shown in FIG. 2a. In the areas, where a layer 8.i with low wear resistance $VF_1$ is applied, the top is merely slightly rounded so that several grooves 11 are created with groove widths B4 corresponding approximately to the layer width B1. The grooves 11 have a groove spacing B5 also of approximately the layer width B1.

Thus, the segment surface 9 constitutes the negative of the desired texturing in the road surface 10. Thus, the wavy segment surface 9 is also transferred onto the road surface 10. This leads to a bridge 14 lying between the grooves 11 also being rounded so that e.g. ice enclosed in the groove 11, when expanding, cannot push away the bridge 14 and break it off.

In order to provide a road surface 10 with grooves 11 over a larger area, pursuant to FIG. 3, a sawing tool 7 is provided comprising a shaft 6 and several diamond saw blades 1. The diamond saw blades 1 are place on the shaft 6 and affixed thereto such that they cannot turn in relation thereto. Between the diamond saw blades 1 each a distance piece 12 (Spacer) running around the perimeter of the shaft 6 is provided which holds the diamond saw blades 1 at a distance A in relation to each other. Hereby, the distance A is chosen such that segments 3 of adjacent diamond saw blades 1 touch each other whereby longitudinal sides 13 of adjacent segments 3 touch each other in a planar manner.

Hereby, the layer construction of the segments 3 is chosen such that the left outer layer 8.1 of each segment 3 is a layer with low wear resistance $VF_1$ and the right outer layer 8.6 of each segment 3 a layer with high wear resistance $VF_2$. When such segments 3 are placed next to each other, the right outer layer 8.6 of one segment 3 touches the left outer layer 8.1 of the right side adjacent segment 3 leading to the alternating layer construction of the segment 3 being continued across the entire sawing tool 7.

Hereby, at a length of the sawing tool 7 of e.g. 0.6 m and a layer width B1 of 1 mm ca. 300 grooves 11 can be structured next to each other into the road surface 10 whereby a groove width B4 of 1 mm and a groove spacing B5 of ca. 1 mm can be attained.

Hereby, the layer width B1, the segment width B2 as well as the spacing A can be adapted at will in order to attain other groove widths B4 that may be required in terms of noise level, skid resistance property and aquaplaning properties. Moreover, for adapting a groove depth T the material of the layers 8.i can be chosen correspondingly so that this ensues, depending on the depth T desired, after a certain time.

In order to be able to press the sawing tool 7 onto the road surface 10, according to FIG. 4, a machine 15 is provided, e.g. a floor cutter, with a holder 16 holding the sawing tool 7 in a rotatable manner whereby the sawing tool 7 can be rotated at a peripheral velocity of e.g. 45 m/s. The holder 16 can be made to approach the road surface 10 so that the segments 3 on the diamond saw blades 1 can interact with the top of the road surface 10 whereby this is removed. Depending on the driving power of the machine 15 grooves 11 can be cut into the road surface 10 at a speed of ca. 3 m to 10 m per minute.

The invention claimed is:

1. A sawing tool for forming a surface structure on a road surface, the sawing tool comprising:
   a) a shaft and a plurality of diamond saw blades;
   b) each diamond saw blade having a disc-like core having a hole for placing on the shaft, and a segment which is arranged on an outer periphery of the core;
   c) the diamond saw blades being arranged with the disc-like core on the shaft;
   d) the segments of adjacent diamond saw blades touch each other in a planar manner at a longitudinal side;
   e) each segment is formed from at least two layers which adjoin each other in an axial direction and which extend in each case in a radial and axial direction;
   f) axially adjacent layers of the segment each have different levels of wear resistance and the wear resistance of the layers alternates in an axial direction over the entire segment, by way of two axially adjacent layers a groove can be formed in order to adjust a skid resistance property and a noise level of the road surface; and
   g) layers, which are adjacent in an axial direction, of adjacent segments have different levels of wear resistance in order to form an alternating layer construction over the entire sawing tool.

2. The sawing tool according to claim 1, wherein:
   a) a segment has an even number of at least four or an odd number of at least five layers, and a groove can be formed in each case by two axially adjacent layers.

3. The sawing tool according to claim 1, wherein:
   a) each layer has diamonds and the wear resistance of the layers is dependent on the concentration and/or the size of the diamonds.

4. The sawing tool according to claim 3, wherein:
   a) the wear resistance of the layers is dependent on a material composition of the layers, and the material composition contains a hardened metal material for chemically and mechanically binding the diamonds.

5. The sawing tool according to claim 4, wherein:
   a) the hardened metal material includes one of tungsten carbide, steel, and copper.

6. The sawing tool according to claim 1, wherein:
   a) each segment formed from at least two layers is sintered.

7. The sawing tool according to claim 1, wherein:
   a) each segment has a segment width of from 3 mm to 20 mm.

8. The sawing tool according to claim 1, wherein:
   a) the layers of a segment have a segment width of from 1 mm to 3 mm.

9. The sawing tool according to claim 1, wherein:
   a) the layers in a segment are rounded at the outer periphery thereof in a surface region in an axial direction, and the rounding of axially adjacent layers alternates over the entire segment in order to form an undulating segment surface and an undulating texturing on the road surface.

10. The sawing tool according to claim 9, wherein:
   a) the rounding of axially adjacent layers alternates over the entire segment, so that layers having a first wear resistance are rounded in a substantially concave manner, and layers having a second wear resistance are substantially convex.

11. The sawing tool according to claim 1, wherein:
   a) the cores of adjacent diamond saw blades are spaced apart from each other by a spacer.

12. The sawing tool according to claim 1, wherein:
   a) a groove depth of a groove which is formed by a diamond saw blade on a road surface is determined by the difference of a diameter of the layers and a groove width of the groove is determined by a layer width of the layers.

13. The sawing tool according to claim 1, wherein:
   a) a segment is pressed in layers with different levels of wear resistance.

14. A machine, the machine including a retention member which can be lowered on a road surface and which retains the sawing tool according to claim 1, and which is constructed to rotate the shaft of the lowered sawing tool in such a manner that a surface structure can be formed on a road surface.

15. A method for forming a surface structure on a road surface with the sawing tool according to claim 1, and wherein:
   a) the sawing tool is lowered onto the road surface and pressed onto it, is rotated at a peripheral speed of from 35 to 55 m/s and is moved at a speed of from 3 m per minute to 10 m per minute over the road surface in order to form the surface structure, and the layers depending on the wear resistance are rounded at the outer periphery thereof in a surface region, and the layers having a first wear resistance are rounded in a substantially concave manner and layers having a second wear resistance are rounded in a substantially convex manner so that an undulating segment surface and an undulating surface structure are formed on the road surface.

16. The sawing tool according to claim 1, wherein:
a) each segment has a segment width of 6 mm.

17. The sawing tool according to claim 1, wherein:
a) the layers of a segment have a segment width of 1 mm.

* * * * *